United States Patent
Miyake et al.

(10) Patent No.: US 8,008,381 B2
(45) Date of Patent: Aug. 30, 2011

(54) POLYCARBONATE RESIN COMPOSITION

(75) Inventors: Toshiyuki Miyake, Chiyoda-ku (JP);
Masami Kinoshita, Chiyoda-ku (JP);
Mizuho Saito, Chiyoda-ku (JP);
Katsuhiko Hironaka, Chiyoda-ku (JP);
Eiichi Kitazono, Iwakuni (JP);
Akimichi Oda, Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 12/597,135

(22) PCT Filed: Apr. 23, 2008

(86) PCT No.: PCT/JP2008/058298
§ 371 (c)(1),
(2), (4) Date: Oct. 22, 2009

(87) PCT Pub. No.: WO2008/133342
PCT Pub. Date: Nov. 6, 2008

(65) Prior Publication Data
US 2010/0076130 A1    Mar. 25, 2010

(30) Foreign Application Priority Data

Apr. 25, 2007 (JP) ................. 2007-115672
May 22, 2007 (JP) ................. 2007-135191

(51) Int. Cl.
C08K 5/103 (2006.01)
C08K 5/134 (2006.01)
C08K 5/15 (2006.01)
C08K 5/524 (2006.01)

(52) U.S. Cl. ........ 524/117; 524/126; 524/147; 524/151; 524/343; 524/351; 524/317; 524/318

(58) Field of Classification Search .......... 524/147–153, 524/323–353
See application file for complete search history.

(56) References Cited

U.S. PATENT DOCUMENTS

| | | |
|---|---|---|
| 6,288,205 B1 | 9/2001 | Miyamoto et al. |
| 6,921,784 B2 | 7/2005 | Dohi et al. |
| 7,241,825 B2 | 7/2007 | Koga et al. |
| 2004/0014851 A1 | 1/2004 | Dohi et al. |
| 2004/0152806 A1 | 8/2004 | Koga et al. |

FOREIGN PATENT DOCUMENTS

| | | |
|---|---|---|
| EP | 2 033 981 A1 | 3/2009 |
| GB | 1079686 A | 8/1967 |
| JP | 2000-239511 A | 9/2000 |
| JP | 2003-292603 A | 10/2003 |
| JP | 2004-027104 A | 1/2004 |
| JP | 2004-083850 A | 3/2004 |
| JP | 2006-028441 A | 2/2006 |
| WO | 03/010236 A1 | 2/2003 |
| WO | 2007/013463 A1 | 2/2007 |
| WO | 2007/063823 A1 | 6/2007 |
| WO | 2007/148604 A1 | 12/2007 |

OTHER PUBLICATIONS

Masahiko Okada, et al., Biodegradable Polymers Based on Renewable Resources. VI. Synthesis and Biodegradability of Poly(Estercarbonate)S Containing 1,4:3,6-Dianhydro-D-Glucitol and Sebacic Acid Units, Journal of Applied Polymer Science, pp. 872-880 (2002), vol. 86, Wiley Periodicals, Inc.

Hans R. Kricheldorf, et al., Polymers of Carbonic Acid. 22. Cholesteric Polycarbonates Derived From (S)-((2-Methylbutyl)Thio)Hydroquinone or Isosorbide, American Chemical Society, Macromolecules, 1996, pp. 8077-8082, vol. 29.

*Primary Examiner* — Peter Szekely

(74) *Attorney, Agent, or Firm* — Sughrue Mion, PLLC

(57) ABSTRACT

An object of the present invention is to provide a polycarbonate resin composition which has a high content of biogenic matter and is excellent in heat resistance, heat stability, moldability, hue and transparency. The present invention relates to a resin composition including 0.0005 to 0.5 part by weight of at least one heat stabilizer (component S) selected from the group consisting of phosphorus-based heat stabilizers (PS) and hindered phenol-based heat stabilizers (HS) based on 100 parts by weight of a polycarbonate resin (component A) which contains a recurring unit represented by the following formula (1) as the main constituent, and a molded article thereof:

(1)

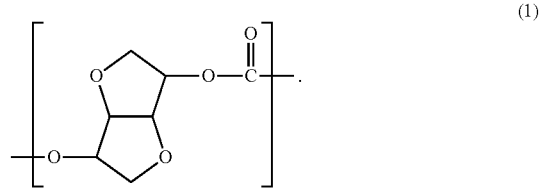

6 Claims, No Drawings

POLYCARBONATE RESIN COMPOSITION

TECHNICAL FIELD

The present invention relates to a resin composition which comprises a polycarbonate resin. More specifically, it relates to a resin composition which comprises a polycarbonate resin obtained from biogenic matter and is excellent in heat resistance, heat stability, moldability, transparency and hue.

BACKGROUND OF THE ART

Polycarbonate resins are polymers obtained by combining aromatic or aliphatic dioxy compounds by means of a carbonate. Out of these, a polycarbonate resin obtained from 2,2-bis(4-hydroxyphenyl)propane (commonly called "bisphenol A") (may be referred to as "PC-A" hereinafter) is used in many fields because it has high transparency and heat resistance and excellent mechanical properties such as impact resistance.

Polycarbonate resins are generally manufactured from raw materials obtained from oil resources. The depletion of oil resources is now apprehended, and the implementation of a polycarbonate resin by using biogenic matter such as plants is desired. A polycarbonate resin obtained from an ether diol raw material which can be manufactured from sugar is now under study.

For example, an ether diol represented by the following formula (a) is easily formed from sugar or starch.

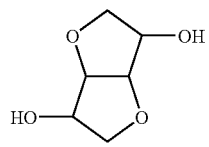

(a)

This ether diol has three known stereoisomers. They are 1,4:3,6-dianhydro-D-sorbitol (to be referred to as "isosorbide" hereinafter in this text) represented by the following formula (b), 1,4:3,6-dianhydro-D-mannitol (to be referred to as "isomannide" hereinafter in this text) represented by the following formula (c), and 1,4:3,6-dianhydro-L-iditol (to be referred to as "isoidide" hereinafter in this text) represented by the following formula (d).

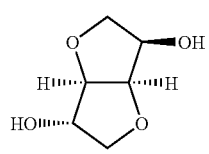

(b)

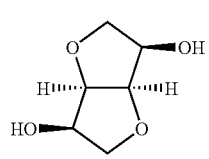

(c)

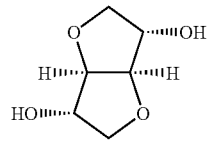

(d)

Isosorbide, isomannide and isoidide are obtained from D-glucose, D-mannose and L-idose, respectively. For example, isosorbide can be obtained by hydrogenating D-glucose and dehydrating it with an acid catalyst.

Out of the above ether diols, the introduction of mainly isosorbide as a monomer into a polycarbonate has been studied. Particularly, a homopolycarbonate of isosorbide is described in patent documents 1 and 2 and non-patent documents 1 and 2.

Patent document 1 proposes a homopolycarbonate resin having a melting point of 203° C. which is obtained by a melt transesterification process. Non-patent document 1 proposes a homopolycarbonate resin having a glass transition temperature of 166° C. which is obtained by the melt transesterification process using zinc acetate as a catalyst. However, this polycarbonate resin is not satisfactory in terms of heat stability because it has a thermal decomposition temperature (5% weight loss temperature) of 283° C. Non-patent document 2 proposes a process of manufacturing a homopolycarbonate resin from a bischloroformate of isosorbide by interfacial polymerization. However, this polycarbonate resin is unsatisfactory in terms of heat resistance because it has a glass transition temperature of 144° C. Patent document 2 proposes a polycarbonate resin having a glass transition temperature of 170° C. or higher.

In order to use these polycarbonate resins derived from biogenic matter as industrial materials, studies must be made to (1) improve the heat resistance and heat stability of the resin, (2) improve the moldability of the resin, and (3) suppress coloration (yellowing) and opacification caused by molding.

(patent document 1) GB A 1079686
(patent document 2) WO2007/013463
(non-patent document 1)"Journal of Applied Polymer Science", 2002, vol. 86, p. 872-880
(non-patent document 2)"Macromolecules", 1996, vol. 29, p. 8077-8082

SUMMARY OF THE INVENTION

It is therefore an object of the present invention to provide a resin composition which is excellent in heat resistance, heat stability, moldability, hue and transparency. It is another object of the present invention to provide a molded article of the resin composition.

The inventors of the present invention have found that, when at least one compound selected from the group consisting of phosphorus-based heat stabilizers (PS) and hindered phenol-based heat stabilizers (HS) is contained as a heat stabilizer (component S) in a polycarbonate resin (component A) derived from sugar, a resin composition which is excellent in heat resistance, heat stability, hue and transparency is obtained.

They have also found that, when at least one compound selected from the group consisting of nitrogen-containing basic compounds, alkali metal compounds and alkali earth metal compounds is used as a polymerization catalyst, a polycarbonate resin (component A) derived from sugar and having excellent heat resistance, heat stability and moldability is obtained. They have also found that, when at least one compound selected from the group consisting of phosphorus-based heat stabilizers (PS) and hindered phenol-based heat stabilizers (HS) is contained in this polycarbonate resin (component A), a resin composition which is excellent in heat resistance, heat stability, hue and transparency is obtained.

Further, they have found that, when a terminal of the polycarbonate resin (component A) derived from sugar is substituted by a group having a specific structure, a resin composition having excellent releasability is obtained without adding a release agent.

That is, the present invention is a resin composition which comprises at least one heat stabilizer (component S) selected from the group consisting of phosphorus-based heat stabilizers (PS) and hindered phenol-based heat stabilizers (HS) in an amount of 0.0005 to 0.5 part by weight based on 100 parts by weight of a polycarbonate resin (component A) containing a recurring unit represented by the following formula (1) as the main constituent. The present invention is a molded article of the resin composition.

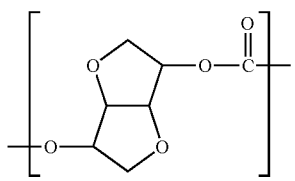

(1)

BEST MODE FOR CARRYING OUT THE INVENTION

The present invention will be described in detail hereinunder.
<Polycarbonate Resin: Component A>

The polycarbonate resin (component A) used in the present invention contains a recurring unit represented by the following formula (1) as the main constituent.

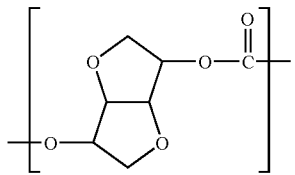

(1)

The content of the recurring unit represented by the formula (1) is preferably 90 to 100 mol %, more preferably 95 to 100 mol %, much more preferably 98 to 100 mol %. The polycarbonate resin is particularly preferably a homopolycarbonate resin composed of only the recurring unit of the formula (1). The recurring unit represented by the formula (1) is preferably a unit derived from isosorbide (1,4:3,6-dianhydro-D-sorbitol).

Another recurring unit is preferably derived from an aliphatic diol or an aromatic bisphenol. The content of the another recurring unit is preferably 10 to 0 mol %, more preferably 5 to 0 mol %, much more preferably 2 to 0 mol %. The aliphatic diol is preferably an aliphatic diol having 2 to 20 carbon atoms, more preferably an aliphatic diol having 3 to 15 carbon atoms. Specific examples of the aliphatic diol include 1,3-propanediol and 1,4-butanediol. Examples of the aromatic bisphenol include 2,2-bis(4-hydroxyphenyl)propane (commonly called "bisphenol A"), 1,1-bis(4-hydroxyphenyl) cyclohexane, 1,1-bis(4-hydroxyphenyl)-3,3,5-trimethylcyclohexane, 2,2-bis(4-hydroxy-3-methylphenyl)propane, 2,2-bis(4-hydroxyphenyl)-4-methylpentane and 1,1-bis(4-hydroxyphenyl)decane.

(Viscosity)

The lower limit of specific viscosity of a solution prepared by dissolving 0.7 g of the polycarbonate resin (component A) in 100 ml of methylene chloride at 20° C. is 0.20, more preferably 0.22, and the upper limit thereof is preferably 0.45, more preferably 0.37, much more preferably 0.34. When the specific viscosity is lower than 0.20, it is difficult to provide sufficiently high mechanical strength to a molded article obtained from the resin composition of the present invention. When the specific viscosity is higher than 0.45, melt flowability becomes too high, whereby the melt temperature at which the resin composition has flowability required for molding becomes higher than the decomposition temperature disadvantageously. The specific viscosity is preferably 0.20 to 0.45.

The polycarbonate resin (component A) has a melt viscosity measured with a capillary rheometer at 250° C. of preferably $0.4 \times 10^3$ to $2.4 \times 10^3$ Pa·s, more preferably $0.4 \times 10^3$ to $1.8 \times 10^3$ Pa·s at a shear rate of 600 $sec^{-1}$. When the melt viscosity falls within this range, mechanical strength become high and a silver streak is not formed at the time of molding the resin composition of the present invention.

(Glass Transition Temperature)

The lower limit of glass transition temperature (Tg) of the polycarbonate resin (component A) is preferably 150° C., more preferably 155° C., and the upper limit thereof is preferably 200° C., more preferably 190° C., much more preferably 168° C., particularly preferably 165° C. The glass transition temperature (Tg) is preferably 150 to 200° C. When Tg is lower than 150° C., heat resistance (especially heat resistance by moisture absorption) deteriorates and when Tg is higher than 200° C., melt flowability degrades at the time of molding the resin composition of the present invention. Tg is measured with the DSC (Model DSC2910) of TA Instruments Co., Ltd.

(5% Weight Loss Temperature)

The lower limit of 5% weight loss temperature (Td) of the polycarbonate resin (component A) is preferably 330° C., more preferably 340° C., much more preferably 350° C., and the upper limit thereof is preferably 400° C., more preferably 390° C., much more preferably 380° C. The 5% weight loss temperature (Td) is preferably 330 to 400° C. When the 5% weight loss temperature falls within the above range, the decomposition of the resin rarely occurs at the time of molding the resin composition of the present invention. The 5% weight loss temperature (Td) is measured with the TGA (Model TGA2950) of TA Instruments Co., Ltd.

(Content of Biogenic Matter)

The content of biogenic matter in the polycarbonate resin (component A) measured in accordance with ASTM D6866 05 is 50 to 100%, preferably 70 to 100%, more preferably 83 to 100%, much more preferably 84 to 100%.

(Terminal Group)

The polycarbonate resin (component A) used in the present invention preferably contains a terminal group represented by the following formula (2) or (3).

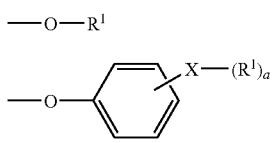 (2)

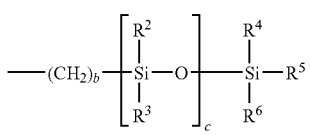 (3)

In the formulas (2) and (3), $R^1$ is an alkyl group having 4 to 30 carbon atoms, aralkyl group having 7 to 30 carbon atoms, perfluoroalkyl group having 4 to 30 carbon atoms or group represented by the following formula (4).

$$-(CH_2)_b - \left[\begin{array}{c} R^2 \\ | \\ Si-O \\ | \\ R^3 \end{array}\right]_c \begin{array}{c} R^4 \\ | \\ Si-R^5 \\ | \\ R^6 \end{array} \quad (4)$$

The number of carbon atoms of the alkyl group of leis preferably 4 to 22, more preferably 8 to 22. Examples of the alkyl group include hexyl group, octyl group, nonyl group, decyl group, undecyl group, dodecyl group, pentadecyl group, hexadecyl group and octadecyl group.

The number of carbon atoms of the aralkyl group of $R^1$ is preferably 8 to 20, more preferably 10 to 20. Examples of the aralkyl group include benzyl group, phenethyl group, methylbenzyl group, 2-phenylpropan-2-yl group and diphenylmethyl group.

The number of carbon atoms of the perfluoroalkyl group of leis preferably 4 to 20. Examples of the perfluoroalkyl group include 4,4,5,5,6,6,7,7,7-nonafluoroheptyl group, 4,4,5,5,6, 6,7,7,8,8,9,9,9-tridecafluorononyl group and 4,4,5,5,6,6,7,7, 8,8,9,9,10,10,11,11,11-heptadecafluoroun decyl group.

In the formula (4), $R^2$, $R^3$, $R^4$, $R^5$ and $R^6$ are each independently at least one group selected from the group consisting of an alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms.

Examples of the alkyl group having 1 to 10 carbon atoms in the formula (4) include methyl group, ethyl group, propyl group, butyl group and heptyl group. Examples of the cycloalkyl group having 6 to 20 carbon atoms include cyclohexyl group, cyclooctyl group, cyclohexyl group and cyclodecyl group. Examples of the alkenyl group having 2 to 10 carbon atoms include ethenyl group, propenyl group, butenyl group and heptenyl group. Examples of the aryl group having 6 to 10 carbon atoms include phenyl group, tolyl group, dimethylphenyl group and naphthyl group. Examples of the aralkyl group having 7 to 20 carbon atoms include benzyl group, phenethyl group, methylbenzyl group, 2-phenylpropan-2-yl group and diphenylmethyl group.

In the formula (4), preferably, $R^2$, $R^3$, $R^4$, $R^5$ and $R^6$ are each independently at least one group selected from the group consisting of an alkyl group having 1 to 10 carbon atoms and aryl group having 6 to 10 carbon atoms. Particularly preferably, $R^2$, $R^3$, $R^4$, $R^5$ and $R^6$ are each independently at least one group selected from the group consisting of methyl group and phenyl group.

B is an integer of 0 to 3, preferably 1 to 3, more preferably 2 or 3. C is an integer of 4 to 100, preferably 4 to 50, more preferably 8 to 50.

X in the formula (3) is at least one bond selected from the group consisting of a single bond, ether bond, thioether bond, ester bond, amino bond and amide bond. X is preferably at least one bond selected from the group consisting of a single bond, ether bond and ester bond. It is particularly preferably a single bond or an ester bond.

A is an integer of 1 to 5, preferably 1 to 3, more preferably 1.

The terminal group represented by the above formula (2) or (3) is preferably derived from biogenic matter. Examples of the biogenic matter include long-chain alkyl alcohols having 14 or more carbon atoms, such as cetanol, stearyl alcohol and behenyl alcohol.

The content of the terminal group represented by the formula (2) or (3) is 0.3 to 9 wt %, preferably 0.3 to 7.5 wt %, more preferably 0.5 to 6 wt % based on the main chain of the polymer.

A resin composition comprising the polycarbonate resin having the above terminal group (component A) has excellent releasability, and the need for adding a release agent is low. Therefore, there is no possibility of coloring by yellowing caused by a release agent at the time of molding.

Preferably, the polycarbonate resin (component A) has a content of biogenic matter measured in accordance with ASTM D6866 05 of 50 to 100%, preferably 83 to 100%, a specific viscosity of a solution prepared by dissolving 0.7 g of the resin in 100 ml of methylene chloride at 20° C. of 0.20 to 0.45, a glass transition temperature (Tg) of 150 to 200° C. and a 5% weight loss temperature (Td) of 330 to 400° C.

<Manufacture of Polycarbonate Resin (Component A)>

The polycarbonate resin (component A) can be manufactured by melt polymerizing an ether diol represented by the following formula (a):

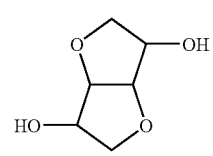 (a)

with a diester carbonate. Examples of the ether diol include isosorbide, isomannide and isoidide represented by the following formulas (b), (c) and (d), respectively.

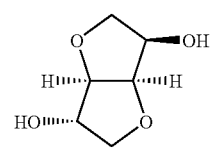 (b)

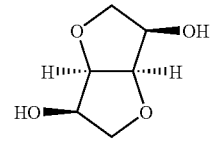 (c)

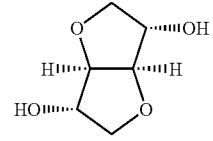 (d)

These ether diols derived from sugar are also obtained from biomass in the natural world and so-called "regenerable resources". Isosorbide can be manufactured by hydrogenating D-glucose obtained from starch and then dehydrating it. The other ether diols are obtained through a similar reaction except for starting materials.

The ether diol is particularly preferably isosorbide (1,4:3, 6-dianhydro-D-sorbitol) represented by the formula (b). Isosorbide is an ether diol which can be easily made from starch, can be acquired abundantly as a resource and is superior to isommanide and isoidide in production ease, properties and application range.

Another aliphatic diol or aromatic bisphenol may be copolymerized as long as the characteristic properties of the polycarbonate resin are not impaired. The proportion of the another aliphatic diol or aromatic bisphenol is preferably 5 to 0 mol %, more preferably 2 to 0 mol %.

The aliphatic diol is preferably an aliphatic diol having 2 to 20 carbon atoms, more preferably an aliphatic diol having 3 to 15 carbon atoms. Specific examples of the aliphatic diol include linear diols such as 1,3-propanediol, 1,4-butanediol, 1,5-pentanediol and 1,6-hexanediol, and alicyclic alkylenes such as cyclohexanediol and cyclohexanedimethanol. Out of these, 1,3-propanediol, 1,4-butanediol, 1,6-hexanediol and cyclohexanedimethanol are preferred.

Examples of the aromatic bisphenol include 2,2-bis(4-hydroxyphenyl)propane (commonly called "bisphenol A"), 1,1-bis(4-hydroxyphenyl)cyclohexane, 1,1-bis(4-hydroxyphenyl)-3,3,5-trimethylcyclohexane, 4,4'-(m-phenylenediisopropylidene)diphenol, 9,9-bis(4-hydroxy-3-methylphenyl)fluorene, 2,2-bis(4-hydroxy-3-methylphenyl)propane, 2,2-bis(4-hydroxyphenyl)-4-methylpentane, 1,1-bis(4-hydroxyphenyl)decane and 1,3-bis{2-(4-hydroxyphenyl)propyl}benzene. Another diol residue may be contained, such as an aromatic diol exemplified by dimethanolbenzene and diethanolbenzene.

The polycarbonate resin having a terminal group represented by the formula (2) or (3) (component A) can be obtained by mixing together an ether diol represented by the above formula (a), a diester carbonate and 0.3 to 15 wt % based on the ether diol of a hydroxyl compound represented by the following formula (e) or (f) and carrying out melt polymerization for distilling off an alcohol or phenol formed by a transesterification reaction at a high temperature under a reduced pressure.

$$HO-R^1 \qquad (e)$$

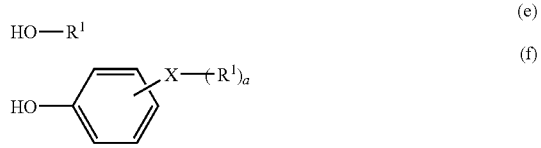

(f)

(in the above formulas, $R^1$, X and a are as defined in the above formulas (2) and (3).)

(Diester Carbonate)

The diester carbonate is an ester such as an aryl group or aralkyl group having 6 to 12 carbon atoms, whose hydrogen atom may be substituted, or alkyl group having 1 to 4 carbon atoms. Specific examples of the diester carbonate include diphenyl carbonate, bis(chlorophenyl) carbonate, m-cresyl carbonate, dinaphthyl carbonate, bis(diphenyl) carbonate, dimethyl carbonate, diethyl carbonate and dibutyl carbonate. Out of these, diphenyl carbonate is particularly preferred from the viewpoints of reactivity and cost.

The amount of the diester carbonate is preferably 1.02 to 0.98 mol, more preferably 1.01 to 0.98 mol, much more preferably 1.01 to 0.99 mol based on 1 mol of the ether diol.

When the molar ratio of the diester carbonate is higher than 1.02, the ester carbonate residue serves as a terminal capping agent, whereby a sufficiently high degree of polymerization cannot be obtained disadvantageously. When the molar ratio of the diester carbonate is lower than 0.98, a sufficiently high degree of polymerization cannot be obtained as well disadvantageously.

(Melt Polymerization)

Melt polymerization can be carried out by mixing together an ether diol and a diester carbonate in the presence of a polymerization catalyst and distilling off an alcohol or phenol formed by a transesterification reaction at a high temperature under a reduced pressure.

The reaction temperature is preferably as low as possible in order to suppress the decomposition of the ether diol and obtain a resin which is little colored and has high viscosity. The polymerization temperature is in the range of preferably 180 to 280° C., more preferably 180 to 260° C. in order to promote the polymerization reaction properly.

Preferably, after the ether diol and the diester carbonate are heated at normal pressure to be pre-reacted with each other in the initial stage of the reaction, the pressure is gradually reduced until the pressure of the system becomes about $1.3 \times 10^{-3}$ to $1.3 \times 10^{-5}$ MPa in the latter stage of the reaction to facilitate the distillation-off of the formed alcohol or phenol. The reaction time is generally about 1 to 4 hours.

(Polymerization Catalyst)

At least one polymerization catalyst selected from the group consisting of nitrogen-containing basic compounds, alkali metal compounds and alkali earth metal compounds is preferably used.

The alkali metal compounds include sodium hydroxide, potassium hydroxide, sodium carbonate, potassium carbonate, sodium hydrogen carbonate, sodium salts of a diphenol and potassium salts of a diphenol. The alkali earth metal compounds include calcium hydroxide, barium hydroxide and magnesium hydroxide. The nitrogen-containing basic compounds include tetramethylammonium hydroxide, tetarethylammonium hydroxide, tetrabutylammonium hydroxide, trimethylamine and triethylamine. They may be used alone or in combination of two or more. Out of these, a combination of a nitrogen-containing basic compound and an alkali metal compound is preferably used.

The amount of the polymerization catalyst is preferably $1 \times 10^{-9}$ to $1 \times 10^{-3}$ equivalent, more preferably $1 \times 10^{-8}$ to $5 \times 10^{-4}$ equivalent based on 1 mol of the diester carbonate. The reaction system is preferably kept in a gas atmosphere such as nitrogen inactive to raw materials, a reaction mixture and a reaction product. Inert gases except nitrogen include argon. Additives such as an antioxidant may be further added as required.

The polycarbonate resin (component A) is preferably obtained by thermally reacting an ether diol represented by the formula (a) with a diester carbonate forming compound at normal pressure in the presence of at least one compound selected from the group consisting of nitrogen-containing basic compounds, alkali metal compounds and alkali earth metal compounds as the polymerization catalyst and carrying out melt polycondensation under heating at 180 to 280° C. and a reduced pressure.

The Cl content of the polycarbonate resin (component A) is preferably 0 to 50 ppm, more preferably 0 to 30 ppm, much more preferably 0 to 10 ppm. The Cl content of the polycarbonate resin can be measured by oxidative decomposition/coulometric titration using a quartz tube combustion system and a wholly organic halogen analyzer (TOX-100 of Dia Instruments Co., Ltd.).

The water content of the polycarbonate resin (component A) is preferably 0 to 500 ppm, more preferably 0 to 300 ppm. The water content of the polycarbonate resin can be measured by a Karl Fischer titration method using a water vaporizer and a trace water measuring instrument (of Mitsubishi Chemical Co., Ltd.).

Therefore, it is preferred that the polycarbonate resin (component A) should have a Cl content of 0 to 50 ppm and a water content of 0 to 500 ppm. When the resin composition of the present invention is manufactured from the polycarbonate resin (component A) having a Cl content and a water content both of which fall within the above ranges by melt extrusion, a resin composition having a good hue can be obtained.

In order to control the Cl content to the above range, it is preferred to manufacture the polycarbonate resin by melt polymerization. It is not preferred to refine the polycarbonate resin by dissolving it in a halogen-based solvent and re-precipitating it with methanol or to manufacture the polycarbonate resin by a solution method in which polymerization is carried out in a halogen-based solvent with an acid binder such as pyridine.

To control the water content of the polycarbonate resin to the above range in the manufacture of the resin composition of the present invention, the polycarbonate resin is preferably dried. As for drying conditions, the polycarbonate resin is preferably dried at a temperature of 100 to 120° C. for about 10 to 48 hours.

<Heat Stabilizer: Component S>

The resin composition of the present invention contains at least one heat stabilizer (component S) selected from the group consisting of phosphorus-based heat stabilizers (PS) and hindered phenol-based heat stabilizers (HS) in an amount of 0.0005 to 0.5 part by weight, preferably 0.001 to 0.3 part by weight, more preferably 0.01 to 0.3 part by weight.

(Phosphorus-Based Heat Stabilizer: PS)

The resin composition of the present invention preferably contains a phosphorus-based heat stabilizer (PS). The phosphorus-based heat stabilizer (PS) is preferably a compound containing a structure represented by the following formula (5).

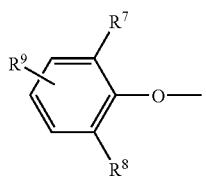

(5)

In the above formula (5), $R^7$ is a hydrogen atom or alkyl group having 1 to 10 carbon atoms, preferably a hydrogen atom or alkyl group having 1 to 4 carbon atoms, particularly preferably hydrogen atom, methyl group, isopropyl group, isobutyl group, tert-butyl group or tert-pentyl group.

$R^8$ is an alkyl group having 4 to 10 carbon atoms, preferably an alkyl group having 4 to 6 carbon atoms, particularly preferably isobutyl group, tert-butyl group, tert-pentyl group or cyclohexyl group.

$R^9$ is at least one group selected from the group consisting of a hydrogen atom, alkyl group having 1 to 10 carbon atoms, alkoxy group having 1 to 10 carbon atoms, cycloalkyl group having 6 to 20 carbon atoms, cycloalkoxy group having 6 to 20 carbon atoms, alkenyl group having 2 to 10 carbon atoms, aryl group having 6 to 10 carbon atoms, aryloxy group having 6 to 10 carbon atoms, aralkyl group having 7 to 20 carbon atoms and aralkyloxy group having 7 to 20 carbon atoms, preferably a hydrogen atom, alkyl group having 1 to 10 carbon atoms or aryl group having 6 to 10 carbon atoms, particularly preferably a hydrogen atom or alkyl group having 1 to 10 carbon atoms.

When the structure represented by the above formula (5) is expressed as "—$X^1$", the phosphorus-based heat stabilizer (PS) is preferably at least one compound selected from the group consisting of compounds represented by the following formulas (6), (7) and (8).

(6)

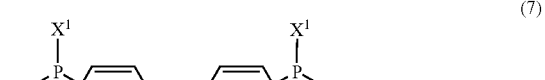

(7)

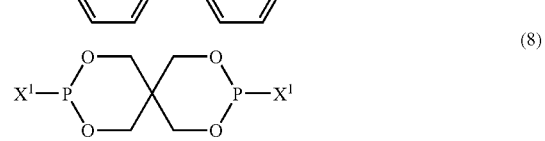

(8)

Preferred examples of the compound of the above formula (6) include tris(2-isobutylphenyl) phosphite, tris(2-tert-butylphenyl)phosphite, tris(2-tert-pentylphenyl)phosphite, tris(2-cyclohexylphenyl)phosphite, tris(2,4-di-tert-butylphenyl)phosphite, tris(2,6-di-tert-butylphenyl)phosphite and tris(2-tert-butyl-6-methylphenyl)phosphite. Out of these, tris(2,4-di-tert-butylphenyl)phosphite is particularly preferred.

Preferred examples of the compound of the above formula (7) include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite and tetrakis(2,6-di-tert-butylphenyl)-3,3'-biphenylene diphosphonite. Out of these, tetrakis(2,4-di-tert-butylphenyl)-4,4'-biphenylene diphosphonite is particularly preferred.

Preferred examples of the compound of the above formula (8) include bis(2-tert-butylphenyl)pentaerythritol diphosphite, bis(2-tert-pentylphenyl)pentaerythritol diphosphite, bis(2-cyclohexylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite and bis(nonylphenyl)pentaerythritol diphosphite. Out of these, bis(2,6-di-tert-butyl-4-methylphenyl)pentaerythritol diphosphite is particularly preferred.

A compound represented by the following formula (9) may be used as the phosphorus-based heat stabilizer (PS).

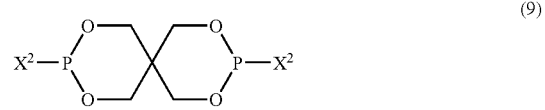

(9)

In the above formula (9), $X^2$ is an alkyl group having 5 to 18 carbon atoms, preferably an alkyl group having 8 to 18 carbon atoms, particularly preferably an alkyl group having 10 to 18 carbon atoms.

Specific examples of the compound of the formula (9) include dihexylpentaerythritol diphosphite, dioctylpentaerythritol diphosphite, dicyclohexylpentaerythritol diphosphite, didecylpentaerythritol diphosphite, didodecylpentaerythritol diphosphite and distearylpentaerythritol diphosphite. Out of these, distearylpentaerythritol diphosphite is particularly preferred. The above compounds as the component S may be used alone or in combination of two or more.

The content of the phosphorus-based stabilizer (PS) is preferably 0.001 to 0.5 part by weight, more preferably 0.005 to 0.5 part by weight, much more preferably 0.005 to 0.3 part by weight, particularly preferably 0.01 to 0.3 part by weight based on 100 parts by weight of the polycarbonate resin (component A). When the content of the phosphorus-based stabilizer (PS) falls within this range, a reduction in the molecular weight or the worsening of the hue of the resin composition of the present invention at the time of molding can be suppressed.

(Hindered Phenol-Based Heat Stabilizer: HS)

The resin composition of the present invention preferably contains a hindered phenol-based heat stabilizer (HS). The hindered phenol-based heat stabilizer (HS) is preferably a compound containing a structure represented by the following formula (10) (to be expressed as "—$X^3$" hereinafter).

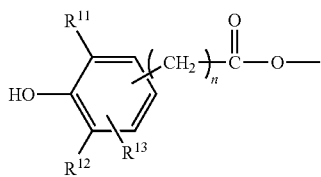

(10)

In the formula (10), $R^{11}$ is a hydrogen atom or alkyl group having 1 to 10 carbon atoms, preferably a hydrogen atom or alkyl group having 1 to 4 carbon atoms, particularly preferably methyl group, ethyl group, isopropyl group, isobutyl group or tert-butyl group.

$R^{12}$ is an alkyl group having 4 to 10 carbon atoms, preferably an alkyl group having 4 to 6 carbon atoms, particularly preferably isobutyl group, tert-butyl group or cyclohexyl group.

$R^{13}$ is at least one group selected from the group consisting of a hydrogen atom, alkyl group having 1 to 10 carbon atoms, alkoxy group having 1 to 10 carbon atoms, cycloalkyl group having 6 to 20 carbon atoms, cycloalkoxy group having 6 to 20 carbon atoms, alkenyl group having 2 to 10 carbon atoms, aryl group having 6 to 10 carbon atoms, aryloxy group having 6 to 10 carbon atoms, aralkyl group having 7 to 20 carbon atoms and aralkyloxy group having 7 to 20 carbon atoms. It is preferably at least one group selected from the group consisting of a hydrogen atom, alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms. It is particularly preferably a hydrogen atom or alkyl group having 1 to 10 carbon atoms. n is an integer of 1 to 4, preferably 1 to 3, particularly preferably 2.

When the structure represented by the above formula (10) is "—$X^3$", the hindered phenol-based heat stabilizer (HS) is preferably at least one compound selected from the group consisting of compounds represented by the following formulas (11), (12) and (13).

(compound of formula (11))

$$X^3—R^{14} \quad (11)$$

In the formula (11), $R^{14}$ is a hydrocarbon group having 8 to 30 carbon atoms, which may contain an oxygen atom, preferably a hydrocarbon group having 12 to 25 carbon atoms, which may contain an oxygen atom, particularly preferably a hydrocarbon group having 15 to 25 carbon atoms, which may contain an oxygen atom.

Preferred examples of the compound of the formula (11) include octadecyl-3-(3,5-di-tert-butyl-4-hydroxyphenyl)propionate, 3,5-bis(1,1-dimethylethyl)-4-hydroxyalkyl benzenepropanoate (alkyl having 7 to 9 carbon atoms and a side chain), ethylenebis(oxyethylene)bis[3-(5-tert-butyl-4-hydroxy-m-tolyl)propionate] and hexamethylenebis[3-(3,5-d-tert-butyl-4-hydroxyphenyl)propionate.

(compound of formula (12))

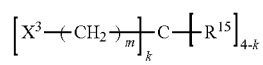

(12)

In the formula (12), "—$X^3$" is a group represented by the above formula (10).

In the formula (12), $R^{15}$ is a hydrogen atom or alkyl group having 1 to 25 carbon atoms, preferably a hydrogen atom or alkyl group having 1 to 18 carbon atoms, particularly preferably an alkyl group having 1 to 18 carbon atoms. m is an integer of 1 to 4, preferably 1 to 3, particularly preferably 2. k is an integer of 1 to 4, preferably 3 to 4, particularly preferably 4. Preferred examples of the compound of the formula (12) include pentaerythritol tetrakis[3-(3,5-di-tert-butyl-4-hydroxyphenyl)propionate].

(compound of formula (13))

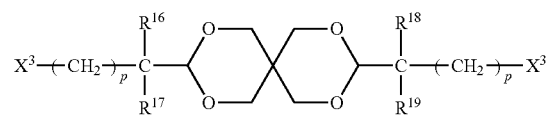

(13)

In the formula (13), "—$X^3$" is a group represented by the formula (10). $R^{16}$, $R^{17}$, $R^{18}$ and $R^{19}$ are each independently a hydrogen atom or alkyl group having 1 to 4 carbon atoms, preferably an alkyl group having 1 to 4 carbon atoms, particularly preferably methyl group. p is an integer of 1 to 4, preferably 1 to 3, particularly preferably 2.

Preferred examples of the compound of the formula (13) include 3,9-bis[2-[3-(3-tert-butyl-4-hydroxy-5-methylphenyl)propionyloxy]-1,1-dimethylethyl]-2,4,8,10-tetraoxaspiro[5.5]undecane.

Out of the compounds represented by the formulas (11), (12) and (13), pentaerythritol tetrakis[3-(3,5-di-tert-butyl-4-hydroxyphenyl)propionate], octadecyl-3-(3,5-di-tert-butyl-4-hydroxyphenyl)propionate and 3,9-bis[2-[3-(3-tert-butyl-4-hydroxy-5-methylphenyl)propionyloxy]-1,1-dimethylethyl]-2,4,8,10-tetraoxaspiro[5.5]undecane are particularly preferred.

The above hindered phenol-based heat stabilizers (HS) may be used alone or in combination of two or more.

The hindered phenol-based heat stabilizer (HS) is preferably a compound represented by the following formula (14)

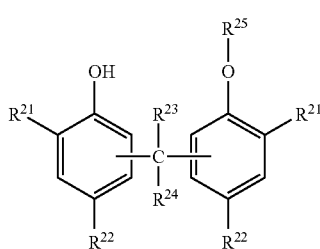

(14)

(in the above formula (14), $R^{21}$ is an alkyl group having 4 to 10 carbon atoms, $R^{22}$ is an alkyl group having 1 to 10 carbon atoms, $R^{23}$ and $R^{24}$ are each independently at least one group selected from the group consisting of a hydrogen atom, alkyl group having 1 to 10 carbon atoms, alkenyl group having 2 to 10 carbon atoms, aryl group having 6 to 10 carbon atoms and aralkyl group having 7 to 20 carbon atoms, and $R^{25}$ is at least one group selected from the group consisting of a hydrogen atom, alkyl group having 1 to 10 carbon atoms, alkenyl group having 2 to 10 carbon atoms, aryl group having 6 to 10 carbon atoms, aralkyl group having 7 to 20 carbon atoms, acryloyl group which may be substituted and methacryloyl group which may be substituted.)

In the formula (14), $R^{21}$ is an alkyl group having 4 to 10 carbon atoms, preferably an alkyl group having 4 to 6 carbon atoms, particularly preferably isobutyl group, tert-butyl group, tert-pentyl group or cyclohexyl group.

$R^{22}$ is an alkyl group having 1 to 10 carbon atoms, preferably an alkyl group having 1 to 4 carbon atoms, particularly preferably methyl group, ethyl group, isopropyl group, isobutyl group or tert-butyl group.

$R^{23}$ and $R^{24}$ are each independently at least one group selected from the group consisting of a hydrogen atom, alkyl group having 1 to 10 carbon atoms, alkenyl group having 2 to 10 carbon atoms, aryl group having 6 to 10 carbon atoms and aralkyl group having 7 to 20 carbon atoms, preferably a hydrogen atom, alkyl group having 1 to 10 carbon atoms or aryl group having 6 to 10 carbon atoms, particularly preferably a hydrogen atom or alkyl group having 1 to 10 carbon atoms.

$R^{25}$ is at least one group selected from the group consisting of a hydrogen atom, alkyl group having 1 to 10 carbon atoms, alkenyl group having 2 to 10 carbon atoms, aryl group having 6 to 10 carbon atoms, aralkyl group having 7 to 20 carbon atoms, acryloyl group which may be substituted and methacryloyl group which may be substituted, preferably a hydrogen atom, alkyl group having 1 to 10 carbon atoms, aralkyl group having 7 to 20 carbon atoms, acryloyl group which may be substituted or methacryloyl group which may be substituted, particularly preferably a hydrogen atom, acryloyl group or methacryloyl group.

Preferred example of the hindered phenol-based heat stabilizer (HS) represented by the formula (14) include 2,2'-methylenebis(6-tert-butyl-4-methylphenol, 2,2'-isopropylidenebis(6-tert-butyl-4-methylphenol, 2-tert-butyl-6-(3-tert-butyl-2-hydroxy-5-methylbenzyl)-4-methylphenyl acrylate, 2-tert-pentyl-6-(3-tert-pentyl-2-hydroxy-5-methylbenzyl)-4-methylphenyl acrylate, 2-tert-butyl-6-(3-tert-butyl-2-hydroxy-5-methylbenzyl)-4-methylphenyl methacrylate, 2-tert-pentyl-6-(3-tert-pentyl-2-hydroxy-5-methylbenzyl)-4-methylphenyl acrylate, 2-[1-(2-hydroxy-3,5-di-tert-butylphenyl)ethyl]-4,6-di-tert-butylphenyl acrylate, 2-[1-(2-hydroxy-3,5-di-tert-pentylphenyl)ethyl]-4,6-di-tert-pentylphenyl acrylate, 2-[1-(2-hydroxy-3,5-di-tert-butylphenyl)ethyl]-4,6-di-tert-butylphenyl methacrylate and 2-[1-(2-hydroxy-3,5-di-tert-pentylphenyl)ethyl]-4,6-di-tert-pentylphenyl methacrylate. Out of these, 2-tert-butyl-6-(3-tert-butyl-2-hydroxy-5-methylbenzyl)-4-methylphenyl acrylate and 2-[1-(2-hydroxy-3,5-di-tert-pentylphenyl)ethyl]-4,6-di-tert-pentylphenyl acrylate are particularly preferred. These compounds may be used alone or in combination of two or more.

The content of the hindered phenol-based heat stabilizer (HS) is preferably 0.0005 to 0.1 part by weight, more preferably 0.001 to 0.1 part by weight, much more preferably 0.005 to 0.1 part by weight, particularly preferably 0.01 to 0.1 part by weight based on 100 parts by weight of the polycarbonate resin (component A). When the content of the hindered phenol-based heat stabilizer (HS) falls within this range, a reduction in the molecular weight and the worsening of the hue of the resin composition of the present invention can be suppressed at the time of molding.

<Release Agent: Component L>

The resin composition of the present invention may contain a mold release agent (component L). The mold release agent (component L) used in the present invention is an ester of an alcohol and a fatty acid. Examples of the alcohol include monohydric alcohols and polyhydric alcohols. The number of carbon atoms of the alcohol is preferably 1 to 25, more preferably 1 to 20, much more preferably 1 to 10. The number of carbon atoms of the fatty acid is preferably 10 to 30, more preferably 10 to 20. The fatty acid is preferably a saturated fatty acid.

An example of the component L is an ester of a monohydric alcohol and a fatty acid. It is preferably an ester of a monohydric alcohol having 1 to 20 carbon atoms and a saturated fatty acid having 10 to 30 carbon atoms. Specific examples of the ester include stearyl stearate, palmityl palmitate, butyl stearate, methyl laurate and isopropyl palmitate.

The esterification rate of the mold release agent (component 1) is preferably 10 to 100%, more preferably 25 to 100, much more preferably 25 to 75%, particularly preferably 25 to 50%. When a release agent having an esterification rate within the above range, the obtained resin composition becomes satisfactory in terms of moldability (releasability) and transparency.

The esterification rate can be obtained from the integral ratios of a proton (around 4.2 to 5.2 ppm) on carbon bonded to an alcohol group forming an ester bond to a proton (around 3.6 to 4.0 ppm) on carbon bonded to an alcohol group not forming an ester bond in the release agent by measuring $^{1}$H-NMR in a heavy chloroform solution of the release agent with the JNM-AL400 of JEOL Corporation.

$$\text{Esterification rate} = \frac{[I_A]}{[I_A] + [I_B]} \times 100\,(\%)$$

$[I_A]$: integral ratio of proton (1 proton) on carbon bonded to an alcohol group forming an ester bond $[I_B]$: integral ratio of proton (1 proton) on carbon bonded to an alcohol group not forming an ester bond Another example of the component L is a partial ester of a polyhydric alcohol and a fatty acid. The term "partial ester" as used herein means that some of the hydroxyl groups of the polyhydric alcohol remain without being ester reacted with the fatty acid. It is preferably a partial ester of a polyhydric alcohol having 1 to 25 carbon atoms and a saturated fatty acid having 10 to 30 carbon atoms.

Still another example of the component L is a whole ester of a polyhydric alcohol and a fatty acid. The term "whole ester" as used herein means that all the hydroxyl groups of the polyhydric alcohol are ester reacted with the fatty acid. It is preferably a whole ester of a polyhydric alcohol having 1 to 25 carbon atoms and a saturated fatty acid having 10 to 30 carbon atoms.

The component L is preferably a partial ester or whole ester of a polyhydric alcohol and a fatty acid, or a mixture thereof. The component L is more preferably a monoester of a polyhydric alcohol and a fatty acid. The partial ester of a polyhydric alcohol and a fatty acid has an advantage that a molded article obtained therefrom has higher transparency than a molded article obtained from the whole ester.

Examples of the partial ester or whole ester of a polyhydric alcohol and a saturated fatty acid include whole esters or partial esters of dipentaerythritol such as glycerin monostearate, glycerin distearate, glycerin tristearate, glycerin monobehenate, pentaerythritol monostearate, pentaerythritol distearate, pentaerythritol tetrastearate, pentaerythritol tetrapelargonate, propylene glycol monostearate, biphenyl biphenate, sorbitan monostearate, 2-ethylhexyl stearate and dipentaerythritol hexastearate.

Out of these esters, partial esters such as glycerin monostearate, glycerin distearate, glycerin monobehenate, pentaerythritol monostearate, pentaerythritol distearate, propylene glycol monostearate and sorbitan monostearate are preferred. Glycerin monostearate, pentaerythritol monostearate and pentaerythritol distearate are more preferred. Glycerin monostearate is particularly preferred. The compounds as the component L may be used alone or in combination of two or more.

The content of the mold release agent (component L) is 0.01 to 0.5 part by weight, preferably 0.03 to 0.5 part by weight, more preferably 0.03 to 0.3 part by weight, particularly preferably 0.03 to 0.2 part by weight based on 100 parts by weight of the polycarbonate resin (component A). When the content of the release agent falls within this range, releasability can be improved while opacification is suppressed.

<Manufacture of Resin Composition>

The process for manufacturing the resin composition of the present invention is not particularly limited. However, a preferred process for manufacturing the resin composition of the present invention is to melt knead components together by using an extruder.

A double-screw extruder is particularly preferred as the extruder, and an extruder having a vent from which water contained in the raw material and a volatile gas generated from the molten kneaded resin can be removed can be preferably used. A vacuum pump is preferably installed to discharge the generated water and volatile gas to the outside of the extruder from the vent efficiently.

A screen for removing foreign matter contained in the extruded raw material may be installed in a zone before the dice of the extruder to remove the foreign matter from the resin composition. Examples of the screen include a metal net, screen changer and sintered metal plate (such as a disk filter).

The method of supplying the component S and other additives (to be simply referred to as "additives" in the following examples) into the extruder is not particularly limited. The following methods are typical examples of the method:
(i) one in which the additives are supplied into the extruder separately from the resin (component A)
(ii) one in which the additives and the resin powder (component A) are pre-mixed by a mixer such as a super mixer and then supplied into the extruder
(iii) one in which the additives and the resin (component A) are melt kneaded together in advance to prepare a master pellet
(iv) one in which the resin and the additives are uniformly dispersed into a solvent to prepare a solution and the solvent is removed as another pre-mixing method.

The resin composition extruded from the extruder is pelletized by directly cutting it or by forming it into a strand and cutting the strand with a pelletizer. When the influence of external dust must be reduced, the atmosphere surrounding the extruder is preferably cleaned. In the manufacture of the above pellet, it is possible to narrow the form distribution of pellets, reduce the number of miscut products, reduce the amount of fine powders generated at the time of conveyance or transportation and reduce the number of cells (vacuum cells) formed in the strand or pellet by employing various methods which have been already proposed for polycarbonate resins for optical disks and cyclic polyolefin resins for optical use. Thereby, the molding cycle can be increased and the incidence of a defect such as a silver streak can be reduced. The shape of the pellet may be columnar, rectangular column-like or spherical, preferably columnar. The diameter of the column is preferably 1 to 5 mm, more preferably 1.5 to 4 mm, much more preferably 2 to 3.3 mm. The length of the column is preferably 1 to 30 mm, more preferably 2 to 5 mm, much more preferably 2.5 to 3.5 mm.

(Molded Article)

Various molded articles can be manufactured by injection molding a pellet of the resin composition of the present invention manufactured as described above. The resin melt kneaded by the extruder can be directly formed into a sheet, film, atypical extrusion molded article, direct blow molded article or injection molded article without using a pellet.

For injection molding, not only ordinary molding techniques but also injection molding techniques such as injection compression molding, injection press molding, gas assist injection molding, foam molding (including what comprises the injection of a super-critical fluid), insert molding, in-mold coating molding, insulated runner molding, quick heating and cooling molding, two-color molding, sandwich molding and super high-speed injection molding may be suitably employed according to purpose to obtain molded articles. The advantages of these molding techniques are already widely known. Both cold-runner molding and hot-runner molding techniques may be employed.

The resin composition of the present invention can be extrusion molded to obtain an atypical extrusion molded article, sheet or film. For the molding of a sheet or a film, inflation, calendering or casting may be used. Further, the resin composition may be molded into a heat shrinkable tube by carrying out specific stretching operation. The resin composition of the present invention can be formed into a molded article by rotational molding or blow molding.

The molded article formed out of the resin composition of the present invention has excellent transparency and hue. The haze measured in accordance with JIS K7105 of a 2 mm-thick flat plate formed out of the resin composition of the present invention and having an arithmetic average surface roughness (Ra) of 0.03 μm or less is preferably 0 to 20%, more preferably 0 to 15%.

The b value of the flat plate is preferably 0 to 14, more preferably 0 to 13, much more preferably 0 to 12. The b value can be measured by using the SE-2000 spectral color meter of Nippon Denshoku Co., Ltd. (light source: C/2).

Various functionalizing agents may be added to the resin composition of the present invention according to application purpose. The agents include a plasticizer, optical stabilizer, heavy metal inactivating agent, flame retardant, lubricant, antistatic agent and ultraviolet absorber. Further, the polycarbonate resin of the present invention may be combined with an organic or inorganic filler or fiber to be used as a complex according to application purpose. Examples of the filler include carbon, talc, mica, wollastonite, montmorillonite and hydrotalcite. Examples of the fiber include natural fibers such as kenaf, synthetic fibers, glass fibers, quartz fibers and carbon fibers.

The resin composition of the present invention may be mixed with a polymer derived from biogenic matter such as polylactic acid, aliphatic polyester, aromatic polyester, aromatic polycarbonate, polyamide, polystyrene, polyolefin, polyacryl, ABS or polyurethane, synthetic resin and rubber to be alloyed.

EXAMPLES

The following examples are provided for the purpose of further illustrating the present invention but are in no way to be taken as limiting. "Parts" in the examples means parts by weight and "%" means wt %. The examples were evaluated by the following methods.
(1) Specific Viscosity ($\eta_{sp}$)
A pellet was dissolved in methylene chloride to a concentration of about 0.7 g/dL to measure the specific viscosity of the resulting solution at 20° C. with an Ostwald's viscosimeter (RIGO AUTO VISCOSIMETER TYPE VMR-0525•PC). The specific viscosity ($\eta_{sp}$) was obtained from the following equation.

$$\eta_{sp} = t/t_0 - 1$$

t: flow time of a specimen solution
$t_0$: flow time of a solvent alone
(2) Content of Biogenic Matter
The content of biogenic matter was measured from a biogenic matter content test based on radio carbon concentration (percent modern carbon; C14) in accordance with ASTM D6866 05.
(3) Glass Transition Temperature
This was measured with the DSC (Model DSC2910) of TA Instruments Co., Ltd. by using the pellet.
(4) 5% Weight Loss Temperature
This was measured with the TGA (Model TGA2950) of TA Instruments Co., Ltd. by using the pellet.
(5) Content of Cl
The content of Cl in the pellet was measured by oxidative decomposition/coulometric titration using a quartz tube combustion system and the TOX-100 wholly organic halogen analyzer of Dia Instruments Co., Ltd.
(6) Water Content
The content of the residual water in the pellet was measured by a Karl Fischer titration method using the water vaporizer and trace water measuring instrument of Mitsubishi Chemical Co., Ltd.
(7) Hue (b Value of Solution)
The pellet was dissolved in methylene chloride to a concentration of 15 wt % and the resulting solution was put into a sample tube having an optical path length of 30 mm. Then, this solution was measured with the 300A color difference meter of Nippon Denshoku Co., Ltd. at 20° C. The b value was calculated from tristimulus values X, Y and Z specified in JIS Z8722 based on a Hunter's color-difference equation. As the numeral value becomes smaller, the hue becomes more achromatic.

(8) Content of Terminal Modifying Group
$^1$H-NMR of the pellet in a heavy chloroform solution was measured with the JNM-AL400 of JEOL Corporation to obtain the content of a terminal modifying group from the integral ratio of a specific proton derived from the ether diol to a specific proton derived from the terminal hydroxy compound. The content of the terminal modifying group was obtained from the following equation.

$$\text{Content of terminal modifying group} = [Rt] \times \frac{[Mt] \times [Re]}{[Me]} \times 100 \,(\text{wt \%})$$

Rt: proportion of terminal hydroxyl compound to ether diol obtained from the integral ratio of $^1$H-NMR
Mt: molecular weight of constituent unit of terminal hydroxyl compound
Re: composition ratio of ether diol in main chain obtained from the integral ratio of $^1$H-NMR
Me: molecular weight of constituent unit of ether diol
(9) Hue (b Value) of Molded Plate
The b value of a 2.0 mm-thick portion of a three-stage type plate molded by the method disclosed in Examples (arithmetic average surface roughness Ra; 0.03 μm) was measured with the SE-2000 spectral color meter of Nippon Denshoku Co., Ltd. (light source: C/2). The b value was calculated from tristimulus values X, Y and Z specified in JIS Z8722 based on the Hunter's color-difference equation. As the numeral value becomes smaller, the hue becomes more achromatic.
(10) Transparency (Haze) of Molded Plate
The haze of the 2.0 mm-thick portion of the three-stage type plate molded by the method disclosed in Examples (arithmetic average surface roughness Ra; 0.03 μm) was measured in accordance with JIS K7105. The haze is the turbidity of a molded article and as the numerical value becomes smaller, the turbidity becomes lower.
(11) Flexural Modulus
After the pellet was dried at 120° C. for 12 hours, it was molded into a bending test piece at a cylinder temperature of 250° C. and a mold temperature of 90° C. by using the JSWJ-75EIII of The Japan Steel Works, Ltd. The bending test was carried out in accordance with ISO178.
(12) Deflection Temperature Under Load (0.45 MPa)
The deflection temperature under load of the bending test piece manufactured in (11) was measured under low load (0.45 MPa) specified by ISO75.

Reference Example 1

Manufacture of Polycarbonate Resin 7,307 parts by weight (50 mols) of isosorbide and 10,709 parts by weight (50 mols) of diphenyl carbonate were fed to a reactor, and 4.8 parts by weight ($1 \times 10^{-4}$ mol based on 1 mol of the diphenyl carbonate component) of tetramethylammonium hydroxide and $5.0 \times 10^{-3}$ part by weight ($0.25 \times 10^{-6}$ mol based on 1 mol of the diphenyl carbonate component) of sodium hydroxide as polymerization catalysts were fed to the reactor and dissolved by heating at 180° C. and normal pressure in a nitrogen atmosphere.

The inside pressure of the reactor was gradually reduced to $13.3 \times 10^{-3}$ MPa over 30 minutes under agitation while the formed phenol was distilled off. After a reaction was carried out in this state for 20 minutes, the temperature was raised to 200° C., the pressure was gradually reduced to $4.00 \times 10^{-3}$ MPa over 20 minutes to carry out the reaction for 20 minutes while the phenol was distilled off, and the temperature was further raised to 220° C. to carry out the reaction for 30 minutes and then to 250° C. to carry out the reaction for 30 minutes.

After the pressure was gradually reduced to continue the reaction at $2.67 \times 10^{-3}$ MPa for 10 minutes and at $1.33 \times 10^{-3}$ MPa for 10 minutes and further reduced to $4.00 \times 10^{-5}$ MPa, the temperature was gradually increased to 260° C., and the reaction was carried out at 260° C. and $6.66 \times 10^{-5}$ MPa for 1 hour in the end. The polymer after the reaction was pelletized to obtain a pellet having a specific viscosity of 0.32. This pellet had a biogenic matter content of 85%, a glass transition temperature of 165° C., a 5% weight loss temperature of 355° C. and a Cl content of 1.8 ppm.

Reference Example 2

Manufacture of Polycarbonate Resin 7,307 parts by weight (50 mols) of isosorbide, 10,923 parts by weight (51 mols) of diphenyl carbonate and 270 parts by weight (1.0 mol) of steary alcohol were fed to a reactor, and 4.7 parts by weight ($1 \times 10^{-4}$ mol based on 1 mol of the diphenyl carbonate component) of tetramethylammonium hydroxide and $4.0 \times 10^{-3}$ part by weight ($0.20 \times 10^{-6}$ mol based on 1 mol of the diphenyl carbonate component) of sodium hydroxide as polymerization catalysts were fed to the reactor and dissolved by heating at 180° C. and normal pressure in a nitrogen atmosphere.

The inside pressure of the reactor was gradually reduced to $13.3 \times 10^{-3}$ MPa over 30 minutes under agitation while the formed phenol was distilled off. After a reaction was carried out in this state for 20 minutes, the temperature was raised to 200° C., the pressure was gradually reduced to $4.00 \times 10^{-3}$ MPa over 20 minutes to carry out the reaction for 20 minutes while the phenol was distilled off, and the temperature was further raised to 220° C. to carry out the reaction for 30 minutes and then to 250° C. to carry out the reaction for 30 minutes.

After the pressure was gradually reduced to continue the reaction at $2.67 \times 10^{-3}$ MPa for 10 minutes and at $1.33 \times 10^{-3}$ MPa for 10 minutes and further reduced to $4.00 \times 10^{-5}$ MPa, the temperature was gradually increased to 260° C., and the reaction was carried out at 260° C. and $6.66 \times 10^{-5}$ MPa for 1 hour in the end. The polymer after the reaction was pelletized to obtain a pellet having a specific viscosity of 0.31. This pellet had a terminal modifying group content of 1.7 wt %, a biogenic matter content of 85%, a glass transition temperature of 150° C., a 5% weight loss temperature of 362° C. and a Cl content of 1.4 ppm.

Reference Example 3

Manufacture of Polycarbonate Resin 7,234 parts by weight (49.5 mols) of isosorbide, 163 parts by weight (0.5 mol) of 1,1-bis(4-hydroxyphenyl)decane and 11,030 (51.5 mols) of diphenyl carbonate were fed to a reactor, and 9.4 parts by weight ($2 \times 10^{-4}$ mol based on 1 mol of the diphenyl carbonate component) of tetramethylammonium hydroxide and $5.2 \times 10^{-2}$ part by weight ($2.5 \times 10^{-6}$ mol based on 1 mol of the diphenyl carbonate component) of sodium hydroxide as polymerization catalysts were fed to the reactor and dissolved by heating at 180° C. and normal pressure in a nitrogen atmosphere.

The inside pressure of the reactor was gradually reduced to $13.3 \times 10^{-3}$ MPa over 30 minutes under agitation while the formed phenol was distilled off. After a reaction was carried out in this state for 20 minutes, the temperature was raised to 200° C., the pressure was gradually reduced to $4.00 \times 10^{-3}$ MPa over 20 minutes to carry out the reaction for 20 minutes while the phenol was distilled off, and the temperature was further raised to 220° C. to carry out the reaction for 30 minutes and then to 250° C. to carry out the reaction for 30 minutes.

After the pressure was gradually reduced to continue the reaction at $2.67 \times 10^{-3}$ MPa for 10 minutes and at $1.33 \times 10^{-3}$ MPa for 10 minutes and further reduced to $4.00 \times 10^{-5}$ MPa, the temperature was gradually increased to 260° C., and the reaction was carried out at 260° C. and $6.66 \times 10^{-5}$ MPa for 1 hour in the end. The polymer after the reaction was pelletized to obtain a pellet having a specific viscosity of 0.38. This pellet had a biogenic matter content of 83%, a glass transition temperature of 158° C., a 5% weight loss temperature of 356° C. and a Cl content of 1.6 ppm.

Examples 1 to 11 and Comparative Examples 1 to 2

Resin compositions in Table 1 were prepared as follows. Components in a ratio shown in Table 1 were weighed and uniformly mixed together by a blender. The resulting mixtures were each dissolved in methylene chloride to a concentration of 15 wt %. The b values of the resulting solutions were measured. The evaluation results are shown in Table 1.

Examples 12 to 20

Resin compositions in Table 2 were prepared as follows. Components in a ratio shown in Table 2 were weighed and uniformly mixed together, and the resulting mixtures were each injected into an extruder to prepare the resin compositions. A vented double-screw extruder having a diameter of 15 mm (KZW15-25 MG of Technobell Co., Ltd.) was used as the extruder. A pellet was prepared under the extrusion conditions of a delivery rate of 14 kg/h, a screw revolution of 250 rpm, a vent vacuum degree of 3 kPa and an extrusion temperature from a first feed port to a dice of 250° C.

After the obtained pellet was dried at 100° C. for 12 hours, it was injection molded at a cylinder temperature of 250° C. and a mold temperature of 90° C. by an injection molding machine [the JSWJ-75EIII of The Japan Steel Works, Ltd.] using a metal mold having a cavity surface with an arithmetic average roughness (Ra) of 0.03 μm to obtain a three-stage type plate having a width of 55 mm, a length of 90 mm and thicknesses of 3 mm (length 20 mm), 2 mm (length of 45 mm) and 1 mm (length of 25 mm) from the gate side and evaluate the releasability and shape of the molded plate having a thickness of 2 mm. The hue and haze of the molded plate were also evaluated. The molded plate obtained in Example 12 had high mechanical strength with a flexural modulus of 3,640 MPa and excellent heat resistance with a deflection temperature under load of 151° C.

The used raw materials in Table 1 are as follows.
(Component A)
A-1: The polycarbonate resin pellet manufactured in Reference Example 1 was dried at 100° C. for 24 hours before it was injected into the extruder. The water content of the dried polycarbonate resin pellet was 240 ppm.
A-2: The polycarbonate resin pellet manufactured in Reference Example 2 was dried at 100° C. for 24 hours before it was injected into the extruder. The water content of the dried polycarbonate resin pellet was 180 ppm.
A-3: The polycarbonate resin pellet manufactured in Reference Example 3 was dried at 100° C. for 24 hours before it was injected into the extruder. The water content of the dried polycarbonate resin pellet was 180 ppm.

(Component S)

S-1: 3,9-bis[2-[3-(3-tert-butyl-4-hydroxy-5-methylphenyl)propionyloxy]-1,1-dimethylethyl]-2,4,8,10-tetraoxaspiro[5.5]undecane (SumilizerGA-80 of Sumitomo Chemical C., Ltd.)

S-2: 2-tert-butyl-6-(3-tert-butyl-2-hydroxy-5-methylbenzyl)-4-methylphenyl acrylate (SumilizerGM of Sumitomo Chemical Co., Ltd.)

S-3: tris(2,4-di-tert-butylphenyl)phosphite (Irgafos168 of Ciba Specialty Chemicals Co., Ltd.)

S-4: bis(2,6-di-tert-butyl-4-methylphenyl)pentaerythritol diphosphite (Adecastab PEP-36 of Adeca Co., Ltd.)

S-5: octadecyl-3-(3,5-di-tert-butyl-4-hydroxyphenyl)propionate (Irganox1076 of Ciba Specialty Chemicals Holding Inc.)

S-6: pentaerythritol tetrakis[3-(3,5-di-tert-butyl-4-hydroxyphenyl)propionate] (Irganox1010 of Ciba Specialty Chemicals Holding Inc.)

S-7 (comparative Example): triphenyl phosphite (Adecastab TPP of Adeca Co., Ltd.)

(Component L)

L-1: monoglyceride stearate (Rikemal S-100A of Riken Vitamin Co., Ltd.), esterification rate: 33%

TABLE 1

| | | | | Ex. 1 | Ex. 2 | Ex. 3 | Ex. 4 | Ex. 5 | Ex. 6 | Ex. 7 |
|---|---|---|---|---|---|---|---|---|---|---|
| Composition | Component A | A-1 | pbw | 100 | 100 | 100 | 100 | 100 | | |
| | | A-2 | pbw | | | | | | 100 | 100 |
| | | A-3 | pbw | | | | | | | |
| | Component S | S-1 | pbw | 0.05 | | | | 0.05 | 0.08 | |
| | | S-2 | pbw | | 0.05 | | | | | 0.05 |
| | | S-3 | pbw | | | 0.05 | | | | |
| | | S-4 | pbw | | | | 0.1 | 0.05 | | |
| | | S-5 | pbw | | | | | | | |
| | | S-6 | pbw | | | | | | | |
| | | S-7 | pbw | | | | | | | |
| | Component L | L-1 | pbw | | | | | | | |
| Evaluation | b value of solution | | | 7 | 12 | 10 | 7 | 9 | 8 | 11 |

| | | | | Ex. 8 | Ex. 9 | Ex. 10 | Ex. 11 | C. Ex. 1 | C. Ex. 2 |
|---|---|---|---|---|---|---|---|---|---|
| Composition | Component A | A-1 | pbw | | | | | 100 | 100 |
| | | A-2 | pbw | 100 | 100 | 100 | | | |
| | | A-3 | pbw | | | | 100 | | |
| | Component S | S-1 | pbw | | | | 0.05 | | |
| | | S-2 | pbw | | | | | | |
| | | S-3 | pbw | 0.03 | | | | | |
| | | S-4 | pbw | | 0.05 | 0.2 | 0.1 | | |
| | | S-5 | pbw | | | | | | |
| | | S-6 | pbw | | | | | | |
| | | S-7 | pbw | | | | | | 0.1 |
| | Component L | L-1 | pbw | | | | | | |
| Evaluation | b value of solution | | | 10 | 9 | 9 | 7 | 17 | 16 |

Ex.: Example
C. Ex.: Comparative Example
pbw: Parts by weight

TABLE 2

| | | | | Ex. 12 | Ex. 13 | Ex. 14 | Ex. 15 | Ex. 16 |
|---|---|---|---|---|---|---|---|---|
| Composition | Component A | A-1 | pbw | 100 | 100 | 100 | 100 | 100 |
| | | A-2 | pbw | | | | | |
| | | A-3 | pbw | | | | | |
| | Component S | S-1 | pbw | | | | 0.03 | |
| | | S-2 | pbw | | | | | 0.05 |
| | | S-3 | pbw | 0.03 | | | | |
| | | S-4 | pbw | | 0.1 | | | |
| | | S-5 | pbw | | | | 0.05 | |
| | | S-6 | pbw | | | | | |
| | | S-7 | pbw | | | | | |
| | Component L | L-1 | pbw | 0.05 | 0.05 | 0.1 | 0.05 | 0.1 |
| Evaluation | Moldability | | | satisfactory | satisfactory | satisfactory | satisfactory | satisfactory |
| | Hue of molded plate | | | 10 | 7 | 11 | 8 | 11 |
| | Haze of molded plate (%) | | | 2 | 1 | 2 | 1 | 1 |

| | | | | Ex. 17 | Ex. 18 | Ex. 19 | Ex. 20 |
|---|---|---|---|---|---|---|---|
| Composition | Component A | A-1 | pbw | 100 | | | |
| | | A-2 | pbw | | 100 | 100 | |
| | | A-3 | pbw | | | | 100 |
| | Component S | S-1 | pbw | | 0.1 | | |
| | | S-2 | pbw | | | | |
| | | S-3 | pbw | | | | |

TABLE 2-continued

|  |  |  | S-4 | pbw | 0.05 |  | 0.2 | 0.1 |
|---|---|---|---|---|---|---|---|---|
|  |  |  | S-5 | pbw |  |  |  |  |
|  |  |  | S-6 | pbw | 0.02 |  |  |  |
|  |  |  | S-7 | pbw |  |  |  |  |
|  |  | Component L | L-1 | pbw | 0.2 | 0.03 | 0.01 | 0.05 |
| Evaluation |  | Moldability |  |  | satisfactory | satisfactory | satisfactory | satisfactory |
|  |  | Hue of molded plate |  |  | 10 | 7 | 11 | 8 |
|  |  | Haze of molded plate (%) |  |  | 2 | 1 | 2 | 2 |

Ex.: Example
pbw: Parts by weight

Effect of the Invention

The resin composition of the present invention is excellent in heat resistance, heat stability, moldability, hue and transparency. Since the resin composition of the present invention contains a polycarbonate resin obtained by using at least one compound selected from the group consisting of nitrogen-containing basic compounds, alkali metal compounds and alkali earth metal compounds as a polymerization catalyst, it has excellent heat resistance and heat stability. The resin composition of the present invention has a high content of biogenic matter. The molded article of the present invention is excellent in heat resistance, heat stability, hue and transparency.

INDUSTRIAL FEASIBILITY

Since the molded article of the present invention is excellent in hue, transparency and mechanical properties, it can be used in a wide variety of fields such as optical parts including optical sheets, optical disks, information disks, optical lenses and prisms, mechanical parts, construction materials, auto parts, resin trays and dinnerware.

The invention claimed is:
1. A resin composition comprising
(i) 0.0005 to 0.5 part by weight of a heat stabilizer (component S) selected from the group consisting of phosphorus-based heat stabilizers (PS) and hindered phenol-based heat stabilizers (HS),
wherein the phosphorus-based heat stabilizer (PS) is at least one compound selected from the group consisting of compounds represented by the following formulas (6), (7), and (8):

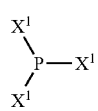
(6)

(7)

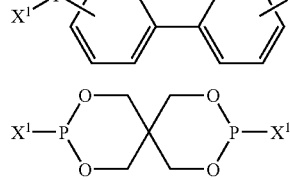
(8)

wherein in the above formulas (6), (7) and (8), $-X^1$ is a group represented by the formula (5) below:

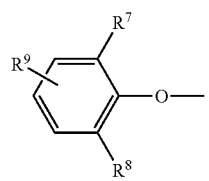
(5)

wherein in the above formula (5), $R^7$ is a hydrogen atom or alkyl group having 1 to 4 carbon atoms, $R^8$ is an alkyl group having 4 to 6 carbon atoms, and $R^9$ is at least one group selected from the group consisting of a hydrogen atom, alkyl group having 1 to 10 carbon atoms, and aryl group having 6 to 10 carbon atoms, wherein the hindered phenol-based heat stabilizer (HS) is at least one compound selected from the group consisting of the following formulas (11), (12), (13) and (14):

$$X^3 - R^{14} \quad (11)$$

wherein in the above formula (11), $-X^3$ is a group represented by the formula (10) below, and $R^{14}$ is a hydrocarbon group having 8 to 30 carbon atoms, which may contain an oxygen atom,

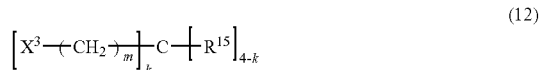
(12)

wherein in the above formula (12), $-X^3$ is a group represented by the formula (10) below, $R^{15}$ is a hydrogen atom or alkyl group having 1 to 25 carbons, m is an integer of 1 to 4, and k is an integer of 1 to 4,

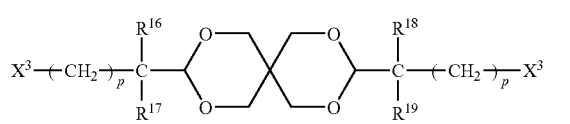
(13)

wherein in the above formula (13), $-X^3$ is a group represented by the formula (10) below, $R^{16}$, $R^{17}$, $R^{18}$ and $R^{19}$ are each independently a hydrogen atom or an alkyl group having 1 to 4 carbon atoms, and p is an integer of 1 to 4, (10)

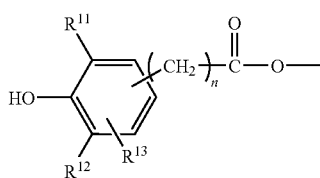

wherein in the above formula (10), $R^{11}$ is a hydrogen atom or alkyl group having 1 to 4 carbon atoms, $R^{12}$ is an alkyl group having 4 to 6 carbon atoms, $R^{13}$ is at least one group selected from the group consisting of a hydrogen atom, alkyl group having 1 to 10 carbon atoms, cycloalkyl group having 6 to 20 carbon atoms, aryl group having 6 to 10 carbon atoms, and aralkyl group having 7 to 20 carbon atoms, and n is an integer of 1 to 4, (14)

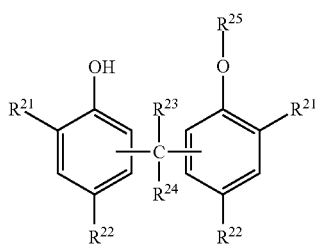

wherein in the above formula (14), $R^{21}$ is an alkyl group having 4 to 6 carbon atoms, $R^{22}$ is an alkyl group having 1 to 4 carbon atoms, $R^{23}$ and $R^{24}$ are each independently at least one group selected from the group consisting of a hydrogen atom, alkyl group having 1 to 10 carbon atoms, and aryl group having 6 to 10 carbon atoms, and $R^{25}$ is at least one group selected from the group consisting of a hydrogen atom, alkyl group having 1 to 10 carbon atoms, aralkyl group having 7 to 20 carbon atoms, acryloyl group and methacryloyl group, (ii) 0.01 to 0.5 part by weight of a mold release agent (component L) which is a monoester of a polyhydric alcohol and a fatty acid, and (iii) 100 parts by weight of a polycarbonate resin (component A) which contains a recurring unit represented by the following formula (1) as the main constituent:

(1)

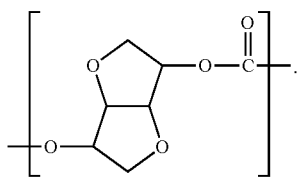

2. The resin composition according to claim 1, wherein the specific viscosity of a solution obtained by dissolving 0.7 g of the polycarbonate resin (component A) in 100 ml of methylene chloride at 20° C. is 0.20 to 0.45.

3. The resin composition according to claim 1, wherein the recurring unit represented by the formula (1) of the polycarbonate resin (component A) is a unit derived from isosorbide (1,4:3,6-dianhydro-D-sorbitol).

4. The resin composition according to claim 1, wherein the polycarbonate resin (component A) is a resin obtained by melt polymerizing an ether diol represented by the following formula (a) with a diester carbonate:

(a)

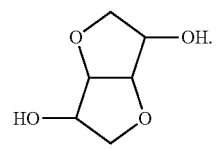

5. The resin composition according to claim 1, wherein the polycarbonate resin (component A) contains a terminal group represented by the following formula (2) or (3) in an amount of 0.3 to 9 wt % based on the recurring unit represented by the formula (1):

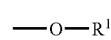 (2)

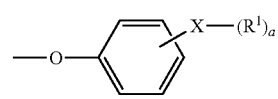 (3)

(in the formulas (2) and (3), $R^1$ is an alkyl group having 4 to 30 carbon atoms, aralkyl group having 7 to 30 carbon atoms, perfluoroalkyl group having 4 to 30 carbon atoms or group represented by the following formula (4):

(4)

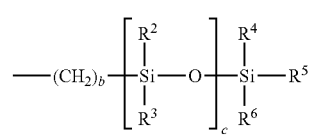

(in the formula (4), $R^2$, $R^3$, $R^4$, $R^5$ and $R^6$ are each independently at least one group selected from the group consisting of an alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms, b is an integer of 0 to 3, and c is an integer of 4 to 100), X is at least one bond selected from the group consisting of single bond, ether bond, thioether bond, ester bond, amino bond and amide bond, and a is an integer of 1 to 5).

6. A molded article of the resin composition of claim 1.

* * * * *